US010733797B2

(12) United States Patent
Farahbakhshian et al.

(10) Patent No.: US 10,733,797 B2
(45) Date of Patent: Aug. 4, 2020

(54) SKELETON ESTIMATION FROM BODY MESH

(71) Applicant: Naked Labs Austria GMBH, Vienna (AT)

(72) Inventors: Farhad Farahbakhshian, Redwood City, CA (US); William Nguyen, Redwood City, CA (US); Bob Free, Redwood City, CA (US)

(73) Assignee: NAKED LABS AUSTRIA GMBH, Vienna (AT)

( * ) Notice: Subject to any disclaimer, the term of this patent is extended or adjusted under 35 U.S.C. 154(b) by 93 days.

(21) Appl. No.: 16/316,529

(22) PCT Filed: Jul. 13, 2017

(86) PCT No.: PCT/EP2017/067672
§ 371 (c)(1),
(2) Date: Jan. 9, 2019

(87) PCT Pub. No.: WO2018/011336
PCT Pub. Date: Jan. 18, 2018

(65) Prior Publication Data
US 2019/0304181 A1    Oct. 3, 2019

(30) Foreign Application Priority Data

Jul. 13, 2016   (DE) .......................... 10 2016 112 889

(51) Int. Cl.
*G06K 9/00*    (2006.01)
*G06T 17/20*    (2006.01)
(Continued)

(52) U.S. Cl.
CPC .......... *G06T 17/20* (2013.01); *G06K 9/00362* (2013.01); *G06K 9/44* (2013.01);
(Continued)

(58) Field of Classification Search
CPC ......... G06K 2209/055; G06K 9/00362; G06K 9/44; G06T 17/20; G06T 2207/30196; G06T 7/12; G06T 7/60
See application file for complete search history.

(56) References Cited

U.S. PATENT DOCUMENTS

| 8,611,670 B2 * | 12/2013 | Plagemann ........ G06K 9/00342 345/419 |
| 2009/0232353 A1 * | 9/2009 | Sundaresan ............. G06T 7/596 382/103 |

(Continued)

FOREIGN PATENT DOCUMENTS

| CN | 101 271 589 | 9/2008 |
| CN | 102 622 606 | 8/2012 |

OTHER PUBLICATIONS

Julien Tierny, Jean-Philippe Vandeborre, Mohamed Daoudi. 3D Mesh Skeleton Extraction Using Topological and Geometrical Analyses. 14th Pacific Conference on Computer Graphics and Applications (Pacific Graphics 2006), Oct. 2006, Tapei, Taiwan. s1poster. ffhal-00725576 (Year: 2006).*

(Continued)

*Primary Examiner* — Li Liu
(74) *Attorney, Agent, or Firm* — Dority & Manning, P.A.

(57) ABSTRACT

A method for extracting information about a body's skeleton from a 3D body mesh includes measuring the closest distance from every vertex of the 3-D body mesh to the centroid of the 3-D body mesh and using these measurements to compute a geodesic map of these distances. Key anchors are then extracted from the geodesic map. The geodesic map and the key anchors are used to segment the 3-D body mesh into body parts. A circumference of each body part is computed, and a centroid of the circumference is determined. For each body part, a body mean curve along the centroid is determined. Skeleton joints between the body (Continued)

parts and connections between these joints are determined. A 3-D body scanner employing this skeleton estimation method is also disclosed.

13 Claims, 7 Drawing Sheets

(51) Int. Cl.
  *G06T 7/12* (2017.01)
  *G06T 7/60* (2017.01)
  *G06K 9/44* (2006.01)

(52) U.S. Cl.
  CPC .................. *G06T 7/12* (2017.01); *G06T 7/60* (2013.01); *G06K 2209/055* (2013.01); *G06T 2207/10028* (2013.01); *G06T 2207/30196* (2013.01)

(56) References Cited

U.S. PATENT DOCUMENTS

| | | | | |
|---|---|---|---|---|
| 2011/0148875 | A1* | 6/2011 | Kim | G06T 13/40 345/420 |
| 2012/0019517 | A1* | 1/2012 | Corazza | G06T 17/20 345/419 |

OTHER PUBLICATIONS

Gong, Faming, and Cui Kang. "3D mesh skeleton extraction based on feature points." 2009 International Conference on Computer Engineering and Technology. vol. 1. IEEE, 2009. (Year: 2009).*

Halim Benhabiles, Guillaume Lavoué, Jean-Philippe Vandeborre, Mohamed Daoudi. Kinematic skeleton extraction based on motion boundaries for 3D dynamic meshes. Eurographics 2012 Workshop on 3D Object Retrieval, May 2012, Cagliari, Italy. pp. 71-76, ff10.2312/3DOR/3DOR12/071-076ff. ffhal00725211 (Year: 2012).*

Correa, Pedro et al., 3D Posture estimation Using Geodesic Distance Maps, Multimedia Tools and Applications, vol. 38, No. 3, Jan. 18, 2008, pp. 364-384.

International Search Report, PCT/EP2017/067672, dated Oct. 19, 2017, 19 Pages.

Jalal, Ahmed et al., "Depth Map-Based Human Activity Tracking and Recognition Using Body Joints Features and Self-Organized Map," Fifth International Conferenece on Computing, Communications and Networking Technologies, Jul. 11, 2014, pages 1-6.

Lovato, Christian et al., "Automatic Segmentation of Scanned Human Body Using Curve Skeleton Alalysis," Network and Parallel Computing, Springer International Publishing, May 4, 2009, pp. 34-45.

Mortara, M et al., "From Geometric to Semantic Human Body Models," Computer and Graphics, Elsevier-GB, vol. 30, No. 2, Apr. 1, 2006, pp. 185-196.

Sun, Xiaopeng et al, "3D Mesh Skeleton Extraction Using Prominent Segmentation," Computer Science and Information Systems, vol. 7, No. 1, Jan. 1, 2010, pp. 63-74.

International Preliminary Report on Patentability, PCT/EP2017/067672, dated Jan. 24, 2019, 2 pages.

Written Opinion of the International Searching Authority, PCT/EP2017/067672, dated Jan. 24, 2019, 8 pages.

Correa, Pedro et al., 3D Posture estimation Using Geodesic Distance Maps, Multimedia Tools and Applications, vol. 38, No. 3, Jan. 18, 2008, pp. 365-384.

Jalal, Ahmad et al., "Depth Map-Based Human Activity Tracking and Recognition Using Body Joints Features and Self-Organized Map," Fifth International Conference on Computing, Communications and Networking Technologies, Jul. 11, 2014, pp. 1-6.

Yu, Yong, A Pose-Independent Method of Animating Scanned Human Bodies, CGI 2008 Conference Proceedings, 2008, 8 pages.

Written Opinion of International Searching Authority, PCT/EP2017/067672, dated Nov. 14, 2017, 19 Pages.

* cited by examiner

SKELETON ESTIMATION FROM BODY MESH

CROSS-REFERENCE TO RELATED APPLICATIONS

The present application is related by subject matter to the following concurrently filed PCT applications (all of which designate the US):

a. International Application No.: PCT/EP2017/067668; entitled "Determination of Body Fat Content by Body-Volume-Distribution and Body-Impedance-Measurement".

b. International Application No.: PCT/EP2017/067669; entitled "Optical Marker to Adjust the Turntable of a 3D Body Scanner".

c. International Application No.: PCT/EP2017/067761; entitled "Efficient Volumetric Reconstruction with Depth Sensors".

d. International Application No.: PCT/2017/067672; entitled "Skeleton Estimation from Body Mesh," which claims priority to German Application No.: DE10 2016 112 889.9.

e. International Application No.: PCT/2017/067667; entitled "Method for Creating a 3D-Model and 3D-Body-Scanner".

f. International Application No.: PCT/2017/067664; entitled "Smart Body Analyzer with 3D Body Scanner and Vital Parameter Sensors".

The above cited PCT international applications are hereby incorporated herein in their entireties by this reference for all purposes. Any combination of the features and aspects of the subject matter described in at least one of the incorporated applications may be combined with embodiments of the present application to yield still further embodiments of the present invention.

FIELD OF THE INVENTION

The invention relates to a skeleton estimation method to extract skeleton information from an input 3D body mesh. Further, the invention relates to a 3D body scanner, which is designed to operate with the skeleton estimation method.

BACKGROUND OF THE INVENTION

Body scanning technologies have become increasingly popular in recent years. However, most proposed body scanners do not provide body skeleton information or body parts segmentation. This information is mostly extracted manually or requires a highly sophisticated body modeling framework to automatically compute. We invented an efficient skeleton estimation method in order to extract skeleton information and body parts automatically. Furthermore; our proposed approach can be performed reasonably fast on a cheap computing device.

Skeleton estimation provides useful information about the human body. This information enables wide fields of applications: Virtual clothes try-on for e-commerce, fitness tracking, medical application and/or game industry From the CN 102622606 B a human skeleton extraction and orientation judging method based on a geodesic model is known. According to the geodesic model, five feature points located at four limbs and the tail end of the head top of the human body are automatically extracted and recognized, a geodesic distance of a vertex of the model is calculated by using the feature points as a start point, a center line of an equal geodesic distance curve group is extracted, the positions of the joint points are determined and skeletons are extracted on the center line according to relevant joint position information. The disadvantage of this method is that the position of the joint points is inexact.

BRIEF OBJECTS AND SUMMARY OF THE INVENTION

The object of the present invention is to provide both a skeleton estimation method to extract skeleton information from an input 3D body mesh and a 3D body scanner operation with this skeleton estimation method, which eliminates the disadvantages of the prior art.

The aforementioned object is achieved by means of a skeleton estimation method to extract skeleton information from an input 3D body mesh and of a 3D body scanner operation with this skeleton estimation method exhibiting the features described below.

Proposed is a skeleton estimation method to extract skeleton information from an input 3D body mesh with the following steps: computing a geodesic map of closest distances from a centroid of the 3D body mesh to every vertex of the 3D body mesh; extracting key anchors from the geodesic map; segmenting the 3D body mesh into body parts by using the geodesic map and the anchors; computing circumferences along the body parts, wherein each circumference comprises a centroid; extracting body mean curves along the centroids of these circumferences; and extracting skeleton joints and connections between these joints.

It is advantageous if the geodesic map visualizes, in particular color-coded, the geodesic distances from the vertices of the 3D body mesh to the centroid of the 3D body mesh.

It is advantageous if in a first step a first class of anchors, which are extrema of the geodesic map, is extracted, in particular the head, the left hand, the right hand, the left foot and/or the right foot.

It is advantageous if in a second step a second class of anchors is derived from the first class of key anchors, in particular the left leg ankle, the right leg ankle, the neck, the left armpit and/or the right armpit.

In an advantageous further aspect, the left and/or right armpit is extracted by determining for the left and/or the right side of the body the closest path in the geodesic map between the anchor of the hand and the anchor of the foot and finding out the highest vertex in this path.

It is advantageous if joints, in particular of the wrists, elbows, shoulders, knees and/or pelvis, are extracted from a curve progression of the circumferences, in particular of each segmented body part, in relation to the height above the ground.

In an advantageous further aspect, the pelvis is determined bottom-up at the height of a first high-peak of the curve progression of the body circumferences, wherein the chest is determined bottom-up at the height of a second high-peak of the curve progression of the body circumferences and/or wherein the neck is determined at the height of the lowest peak of the curve progression of the body circumferences.

It is advantageous if the segmentation of the 3D body mesh is refined into refined body regions, in particular shoulders, heaps and/or chest, using the joints extracted from the curve progression of the circumferences.

In an advantageous further aspect, the refined segmentation is used to refine the position of the skeleton joints.

It is advantageous if the step for refining the segmentation and the step for refining the position of the skeleton joints are repeated iteratively.

It is advantageous if for a skeleton optimization the joints must move inside the body mesh and be as close as possible to the associated mean curve.

In an advantageous further aspect, the body proportion ration is used in order to constrain the joints adjustment.

Proposed is a 3D body scanner comprising: at least one sensor for scanning a human body and generating a 3D body mesh and a processor for extracting skeleton information from the 3D body mesh, which is designed to operate with a skeleton estimation method to extract skeleton information from the 3D body mesh as set forth in the previous specification.

BRIEF DESCRIPTION OF THE DRAWINGS

Additional advantages of the invention are described in the following exemplary embodiments. The drawings show in.

DETAILED DESCRIPTION OF EXEMPLARY EMBODIMENTS OF THE INVENTION

This invention proposes a skeleton estimation method in order to accurately extract important bone joints and connections between joints from an input body mesh. Additionally, the method also segments the body mesh into meaningful body regions such as head, neck, chest, etc.

Figure 1:
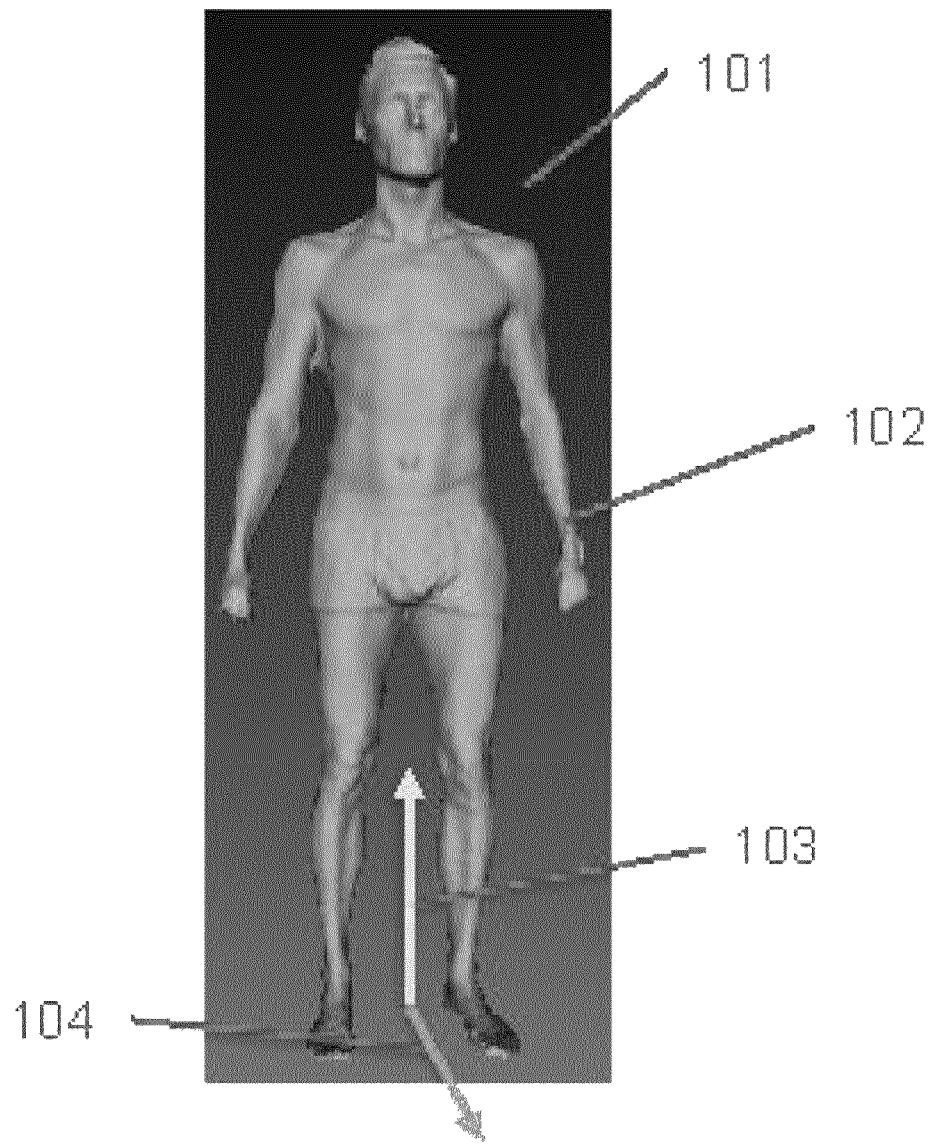
FIG. 1 Body mesh and assumption,
FIG. 2 Overview of skeleton estimation pipeline,
FIG. 3 Key anchors extraction,
FIG. 4 Key body parts segmentation,
FIG. 5 Circumferences and mean curves extraction,
FIG. 6 Curve progressions of the circumferences of three different scans and
FIG. 7 Body parts segmentation refinement and further skeleton extraction.

Our invented body skeleton estimation method is based on these assumptions of the body mesh input:
1. Body mesh must have an upright posture as shown in FIG. 1.
2. Arms and hands must not touch the body (102 in FIG. 1); in other words, there are no common vertices between body and arms and hands.
3. Up direction and forward direction of the body must be given.

Figure 2:
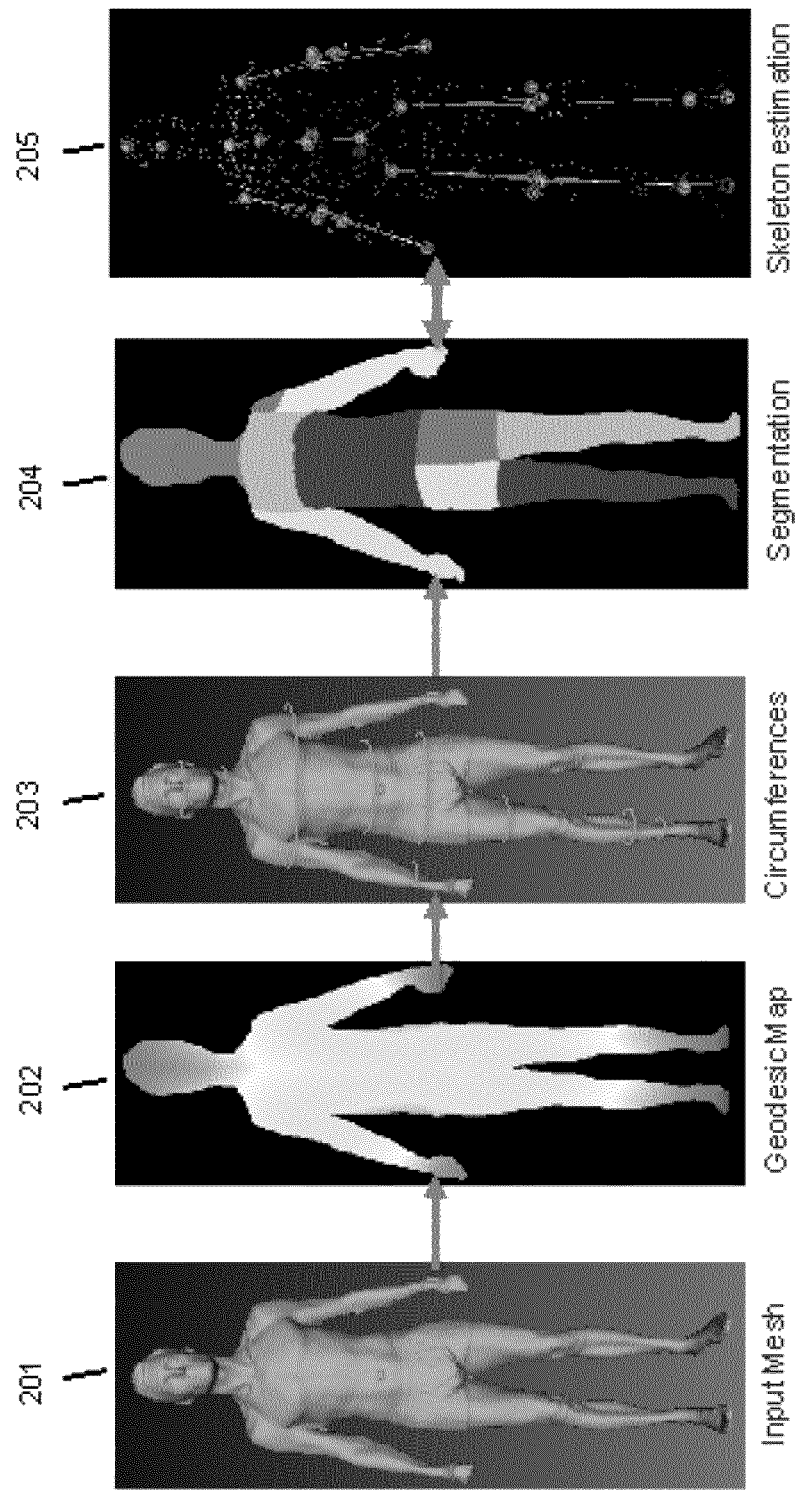

When the assumptions are satisfied, our method can perform skeleton estimation in the sequence as illustrated in FIG. 2.

In the sequence, FIG. 2, an input body mesh 201 is used to compute a geodesic map 202. The map 202 is visualized with color-coded geodesic distances from mesh vertices to body centroid; colors range from blue to yellow to red in order to visualize distances from close to far respectively. Using the map 202, we extract key body anchors and compute circumferences 203. Then, we iteratively label body parts 204 of the body mesh 201 and extract skeleton joints 205 of the body mesh 201, labeled as 204 and 205 in FIG. 2.

In the following sub-sections, we will break the sequence into smaller components in order to provide a detailed explanation.

Geodesic Map Generation:

A 3D mesh is represented as 3D vertices and 3D edges between vertices. The mesh representation can be seen as a graph of nodes and edges. There is a distance value associated with each edge, which is the 3D distance between two nodes of the edge. So, we can compute a map of closest distances from centroid of the mesh to every vertex of the mesh. Such map is called geodesic map and is visualized with color codes as 202 in FIG. 2, or 302 in FIG. 3.

Figure 3:
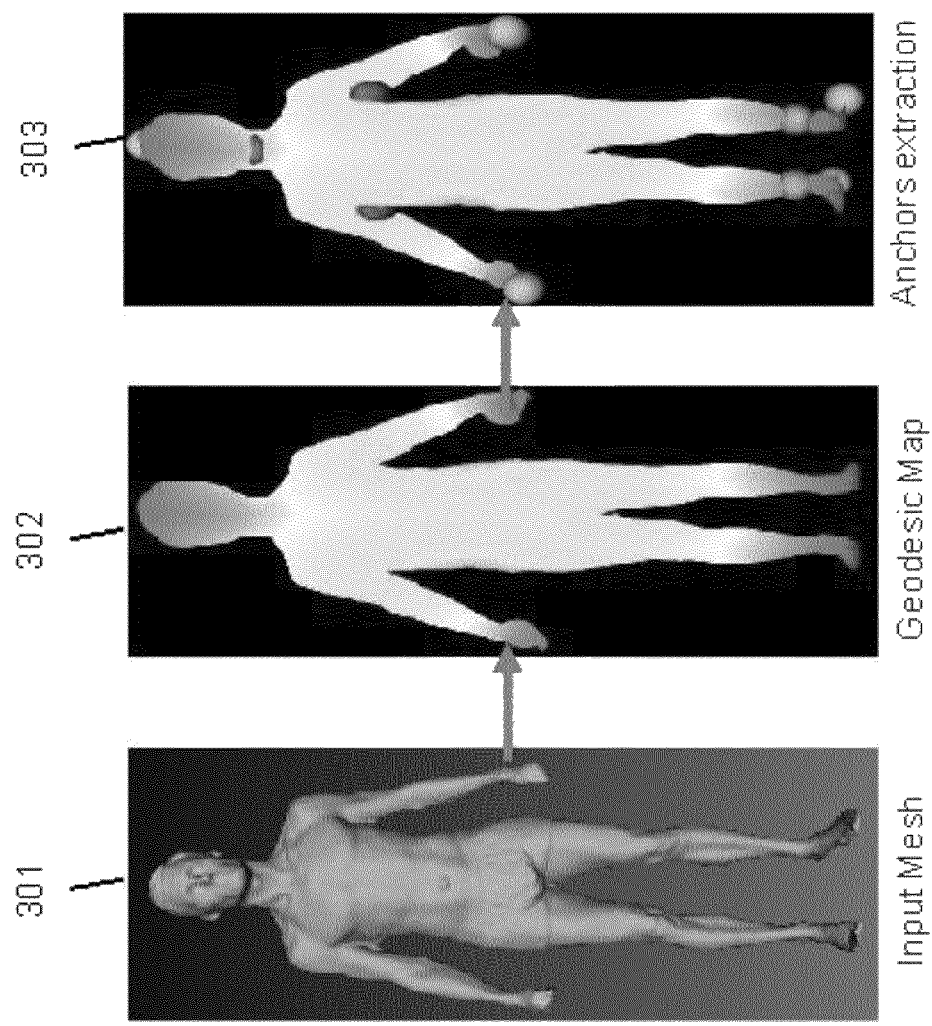

Key Anchors Extraction and Initial Body Parts Segmentation:

As illustrated in FIG. 3, key anchors of the body are extracted given the input geodesic map. In our method, we extract key anchors: HEAD, LEFT HAND, RIGHT HAND, LEFT FOOT, RIGHT FOOT. These anchors are also extrema of the geodesic map. Alternatively, FEET can also be derived by directly segmenting the left-most and the rightmost of the lowest vertices.

From this first class of key anchors, we can derive a second class of anchors which are LEFT LEG ANKLE, RIGHT LEG ANKLE, NECK, LEFT ARMPIT, and RIGHT ARMPIT. The LEFT ARMPIT is extracted by walking through the closest path from LEFT HAND to LEFT FOOT and finding out the highest vertex. The RIGHT ARMPIT is extracted in a similar way.

Ideally, a robust body anchors extraction is achieved given the body mesh.

Figure 4:
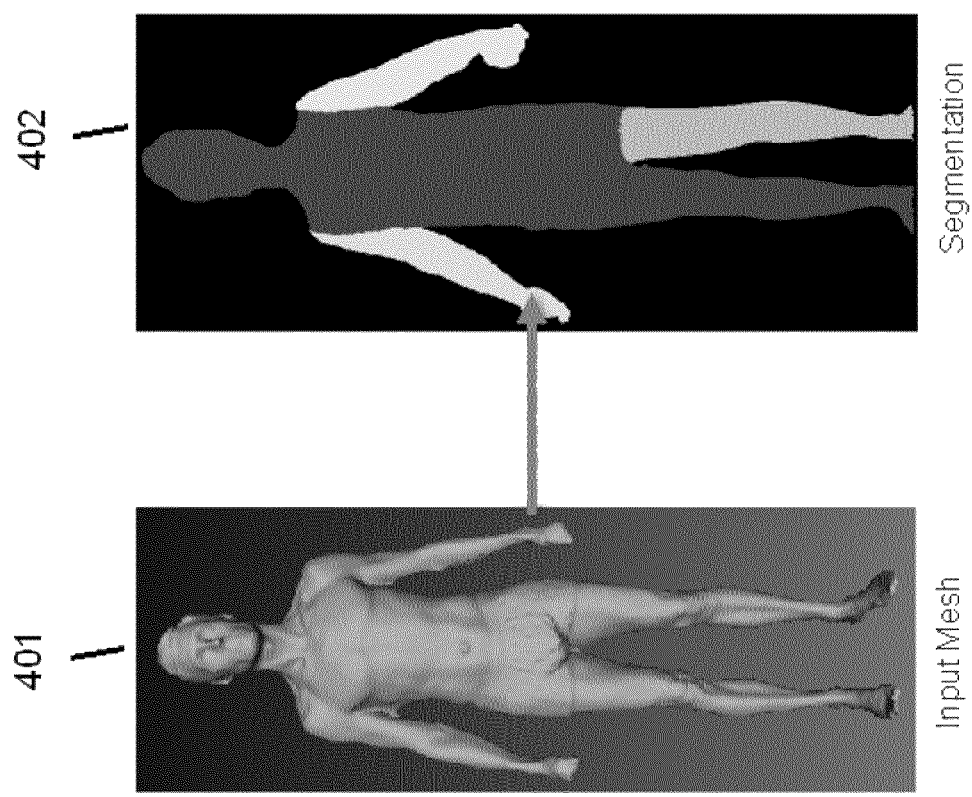

Using the geodesic map and anchors, we label the body mesh vertices to key regions: GREEN as RIGHT HAND, CYAN as LEFT HAND, BLUE as BODY, PURPLE as RIGHT LEG, ORANGE as LEFT LEG. FIG. 4 illustrates these regions of an input body mesh 401.

Figure 5:
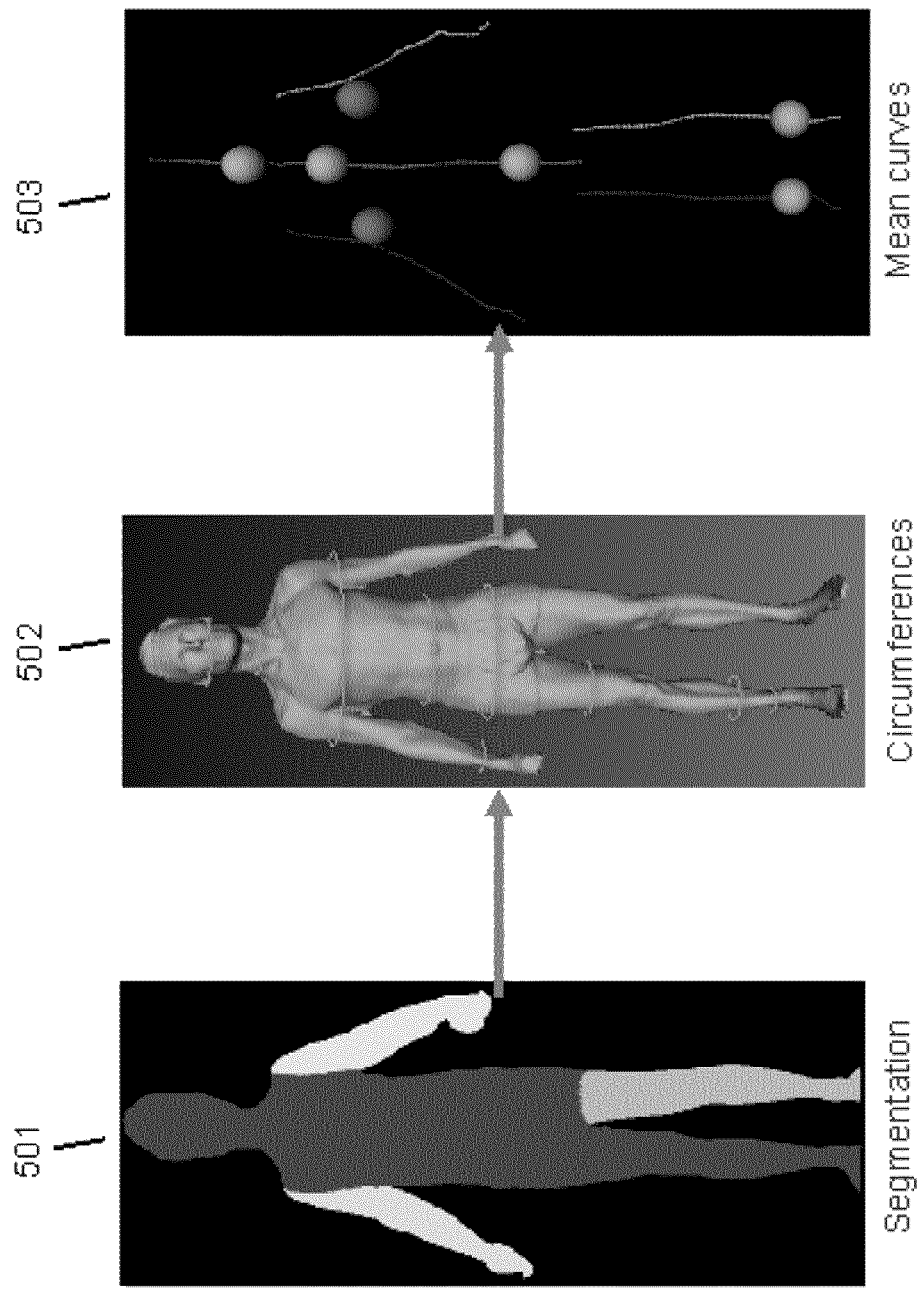

Circumferences and Mean Curves Extraction:

We use the initially labeled regions of the body mesh in order to compute circumferences along these regions. For instance, we compute circumferences of every centimeter from lowest point to highest point of the right leg (as PURPLE in 501 of FIG. 5); the circumferences are visualized as green circles along the up direction for every region of the body. This is a robust extraction of the circumferences.

After computing circumferences, we then extract mean curves along these circumferences. Each circumference has a centroid. The extracted centroids of circumferences are visualized as small red balls (BODY region), green balls (LEFT HAND region, and LEFT LEG region), and blue balls (RIGHT HAND region, and RIGHT LEG region) in 503 in FIG. 5. The body mean curves are extracted along the centroids of these circumferences. This is a robust extraction of the body mean curves.

Figure 6:
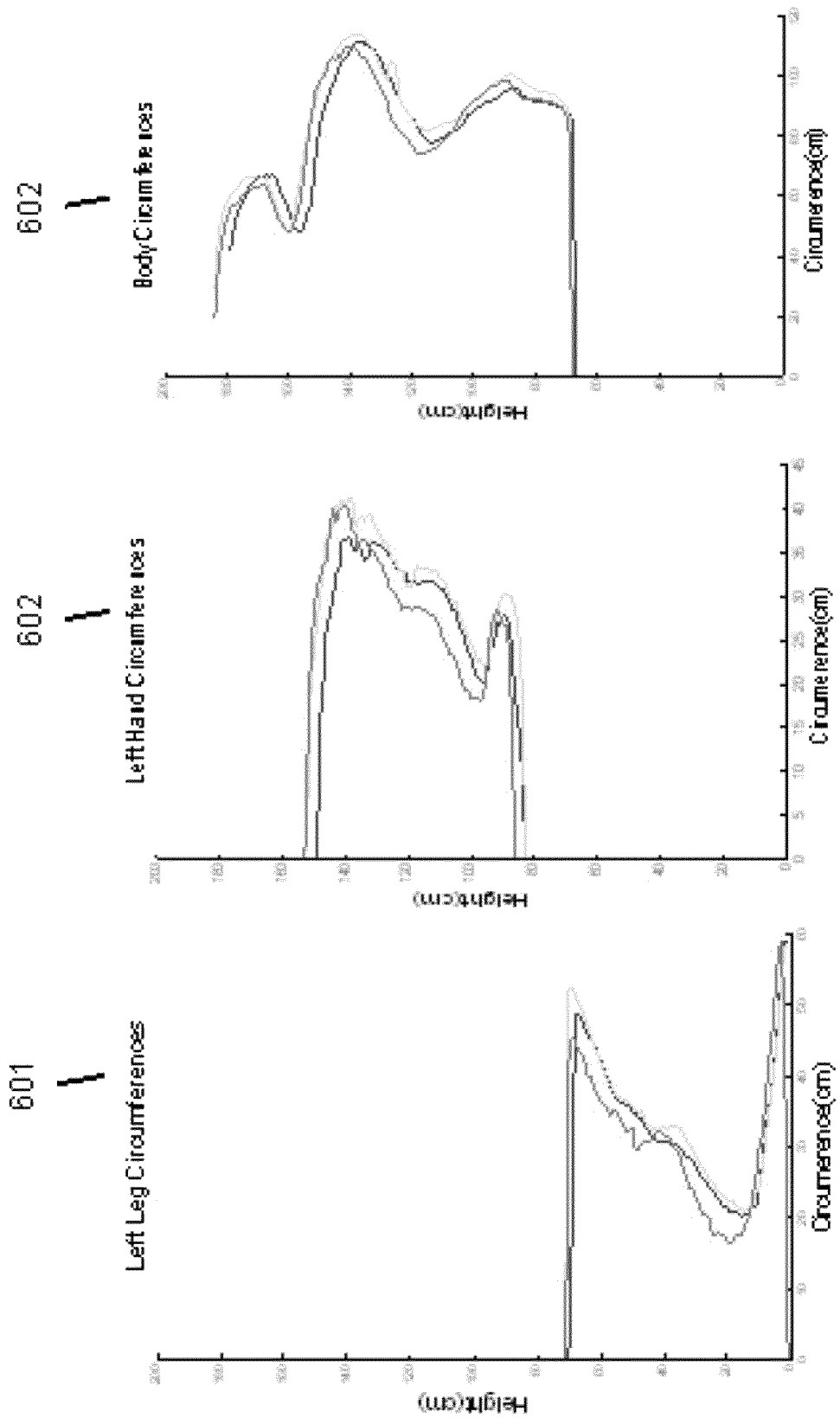

Iterative Skeleton Extraction and Segmentation Refinement:

From the circumferences as shown in FIG. 6, we can extract other joints of hand and leg regions: LEFT WRIST, RIGHT WRIST, LEFT ELBOW, RIGHT ELBOW, LEFT SHOULDER, RIGHT SHOULDER, LEFT KNEE, RIGHT KNEE, LEFT PELVIS and/or RIGHT PELVIS.

From circumferences of the body 602 in FIG. 6, we can determine the pelvis which is at the height of the first high-peak of circumferences (approximately at 90 cm height). Additionally, we can determine the chest as the second high-peak of the circumferences at around 140 cm height. Finally, we can determine the neck as the lowest peak which is at 160 cm height.

These joints are then used to refine body regions labels. So, finer regions such as shoulders, hips, and chest are further refined (illustrated 701 in FIG. 7). We then use these labeled vertices of the body mesh to refine the skeleton joints. These two steps are iteratively refined in a few iterations. The result is a robust and accurate skeleton estimation as well as a fast and robust body parts segmentation.

Figure 7:
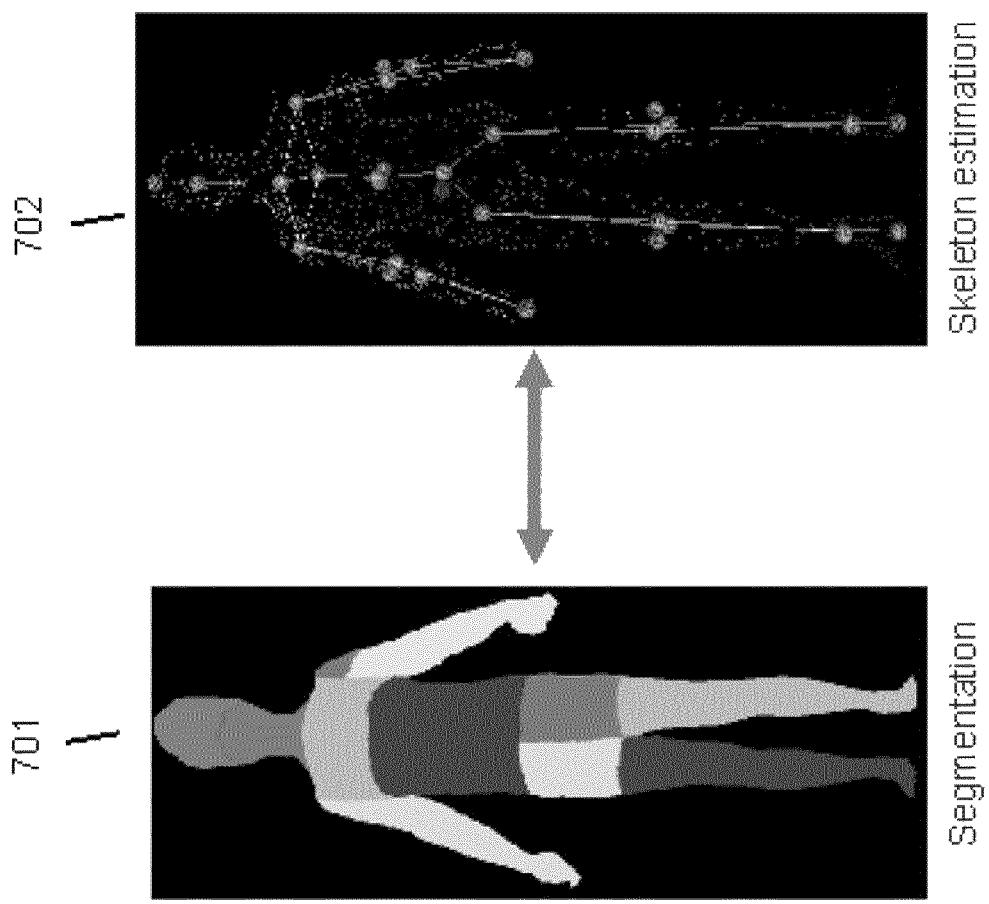

Skeleton Optimization:

For skeleton optimization, we use mean curves of key body regions (hand, leg, body 503 in FIG. 5) and labeled vertices (701 in FIG. 7). We formulate the skeleton optimization as a non-linear optimization problem where we minimize a cost function such that it adjusts skeleton joints in a constrained way. The joints must move inside the body mesh and be as close as possible to the associated mean curve. For example, the LEFT_ELBOW joint must move as close as possible to the left hand region mean curve.

In addition, we also use the body proportion ratio in order to constrain the joints adjustment. For instance, the distance between LEFT_FOOT and LEFT_KNEE must be approximately equal to the distance between RIGHT_FOOT and RIGHT_KNEE. This novel and efficient skeleton optimization scheme can achieve real-time performance.

The invention is not limited to the embodiments shown or described. Rather, any and all combinations of the individual features described, as shown in the figures or described in the description, and to the extent that a corresponding combination appears possible and sensible, are subject matters of the invention.

Skeleton estimation from a human body mesh poses hard challenges due to the variation of body shape. Various research and industry groups have been actively tackling the challenges. Our solution focuses on robust and accurate estimation results while retaining high speed performance. This enables lots of applications including skeletal based body animation, body measurements extraction, and body deformation, which are only a few mentioned.

LIST OF REFERENCE CHARACTERS

101: body mesh with upright position
102: separation of body and hand
103: known up direction
104: known forward direction with respect to the body
201: input body mesh
202: geodesic map of the mesh
203: circumferences extraction
204: body parts segmentation
205: skeleton estimation
301: input body mesh
302: geodesic map of the mesh
303: extracted key extrema of the geodesic map, highlighted as orange balls. Other key anchors are also extracted and highlighted with purple balls and green balls
401: input body mesh
402: initial body parts segmentation with BLUE: body & head, GREEN: right hand, CYAN: left hand, PURPLE: right leg, ORANGE: left leg
501: initial segmentation as shown in FIG. 4
502: circumferences extracted along body and limbs given labeled mesh (from segmentation)
503: mean curves computed from circumferences along body and limbs
601: left leg circumferences of three different scans of one person
602: left hand circumferences of three different scans
603: body circumferences of three different scans
701: body parts segmentation where each labeled color represents one distinct part. For instance, RED region is head region, YELLOW upper region is right shoulder region.
702: extracted skeleton joints and connections between joints. GREEN balls represent initial extracted joints while CYAN balls represent optimized joints.

The invention claimed is:

1. Skeleton estimation method to extract skeleton information from an input 3D body mesh having a centroid and a plurality of vertexes spaced apart from the centroid, the method including following steps:
for each of the plurality of vertexes, computing a closest distance to the centroid of the 3D body mesh;
creating a geodesic map from these closest distances;
extracting key anchors from the geodesic map;
segmenting the 3D body mesh into body parts by using the geodesic map and the key anchors;
for each of the body parts, computing a circumference wherein each circumference comprises a centroid of the respective body part;
extracting body mean curves along the centroids of each of these circumferences of the respective body parts; and
extracting for each of the respective body parts, skeleton joints and connections between these joints.

2. Method according to claim 1, further comprising color coding the closest distances from the vertices of the 3D body mesh to the centroid of the 3D body mesh.

3. Method according to claim 1, wherein the step of extracting key anchors includes a first step of extracting the following first class of key anchors, which are extrema of the geodesic map, namely, the head, the left hand, the right hand, the left foot and the right foot.

4. Method according to claim 3, wherein in a second step of extracting key anchor's a second class of key anchors is derived from the first class of key anchors, which include the left leg ankle, the right leg ankle, the neck, the left armpit and the right armpit.

5. Method according to claim 4, wherein the left armpit is extracted by determining for the left side of the body the closest path in the geodesic map between the key anchor of the hand and the key anchor of the foot and finding out the highest vertex in this path.

6. Method according to claim 4, wherein each of the following joints, namely the wrists, elbows, shoulders, knees and pelvis, is extracted from a curve progression of the circumference of each segmented body part, in relation to the height of the body part above the ground.

7. Method according to claim 6, wherein the pelvis is determined bottom-up at the height of a first high-peak of the curve progression of the body circumferences,
wherein the chest is determined bottom-up at the height of a second high-peak of the curve progression of the body circumferences and
wherein the neck is determined at the height of the lowest peak of the curve progression of the body circumferences.

8. Method according to claim 4, further comprising the step of refining the segmentation of the 3D body mesh into refined body regions, which include the shoulders, hips and chest, using the joints extracted from the curve progression of the circumferences.

9. Method according to claim 8, wherein the refined segmentation is used to refine the position of the skeleton joints.

10. Method according to claim 9, wherein the step for refining the segmentation and the step for refining the position of the skeleton joints are repeated iteratively.

11. Method according to claim 1, further comprising the step of skeleton optimization under which the joints must move inside the body mesh and be as close as possible to the associated mean curve.

12. Method according to claim 11, further comprising the step of applying a body proportion ratio in order to constrain the adjustment of the joints during skeleton optimization.

13. 3D body scanner comprising:
at least one sensor for scanning a human body and generating a 3D body mesh; having a centroid and a plurality of vertexes spaced apart from the centroid; and
a processor for extracting skeleton information from the 3D body mesh, the processor being configured with a skeleton estimation method to extract skeleton information from the 3D body mesh, the method including the following steps:
for each of the plurality, of vertexes, computing a closest distance to the centroid of the 3D body mesh;
creating a geodesic map from these closest distances;
extracting key anchor from the geodesic map;
segmenting the 3D body mesh into body parts by using the geodesic map and the key anchors;
for each of the body parts, computing a circumference wherein each circumference comprises a centroid of the respective body part;
extracting body mean curves along the centroids of each of these circumferences of the respective body parts; and
extracting for each of the respective body parts, skeleton joints and connections between these joints.

\* \* \* \* \*